Patented Mar. 2, 1943

2,312,572

UNITED STATES PATENT OFFICE 2,312,572

PROCESS OF PREPARING AND TREATING CATALYSTS

Glen H. Morey, Terre Haute, Ind., and Frederick E. Frey, Bartlesville, Okla., assignors to Phillips Petroleum Company, a corporation of Delaware No Drawing. Application November 9, 1937, Serial No. 173,709

26 Claims. (Cl. 252—254)

This invention relates to a process of preparing and treating catalysts. It has particular relation to preparing and treating catalysts containing black, unglowed chromium oxide.

Catalysts which contain black, unglowed chromium oxide may be used industrially in the conversion of various materials into more useful products, especially the dehydrogenation or hydrogenation of organic chemical compounds. For example catalysts of this type may be used for converting hydrocarbons by changing their carbon-to-hydrogen ratio at more or less elevated temperatures. This particular use of catalysts of this type is of great present-day importance because it leads to the economical utilization of normally gaseous and heretofore not completely utilized petroleum hydrocarbons by dehydrogenation into the corresponding mono-olefins, which may then be converted into products of greater industrial value. Similarly, catalysts of this type may be employed to facilitate the reverse reaction of hydrogenation of materials containing unsaturated carbon-to-carbon linkages, as may be exemplified by the non-destructive hydrogenation of di-isobutylene to iso-octane or of unsaturated polymer-gasoline into motor fuel of less unsaturated characteristics. A chromium oxide gel catalyst suitable for these purposes has been described in U. S. Patent No. 1,905,383 and in an article by Frey and Huppke published in Industrial and Engineering Chemistry, vol. 25, January, 1933, pp. 54–59. In the copending application of Frey and Huppke, Serial No. 723,608, filed May 2, 1934, now U. S. Patent 2,098,959, issued November 16, 1937, it has been disclosed that it is sometimes desirable to incorporate or commingle homogeneously with the chromium oxide one or more infusible and difficultly reducible oxides, such as alumina, zirconia, thoria, silica and the like, in such a way that gel characteristics are conserved. Heavy metal oxides, such as those of thallium, bismuth, lead and mercury may also in certain cases contribute desirable qualities to the gel catalyst.

In preparation of these gel catalysts, which contain black, unglowed chromium oxide, a solution containing a chromic salt is used and a hydrous gel is formed by precipitation with an alkali solution such as a solution of ammonia. In many cases, as has been disclosed in Morey's copending application, Serial No. 113,091, filed November 27, 1936, now U. S. Patent 2,288,320, issued June 30, 1942, it is advantageous to precipitate the hydrous gel from a solution containing colloidally dispersed chromic oxide instead of from a true solution of a chromic salt. The hydrous gel is suitably washed and dried and the resulting homogeneous oxide mixture is suitable reduced before use as a catalyst.

In the copending application of Matuszak and Morey, Serial No. 173,708, filed November 9, 1937, now U. S. Patent 2,294,414, issued September 1, 1942, it is disclosed that catalysts containing black, unglowed chromium oxide and capable of catalytically converting hydrocarbons by changing their carbon-to-hydrogen ratio at elevated temperatures may also be prepared through subjecting an ammonium-containing salt of chromic acid, such as, in the simplest case, crystalline ammonium dichromate or ammonium chromate, to a controlled and non-spontaneous thermal decomposition whereby a black, porous but dense and coherent, pseudocrystalline, crystallomorphous and granular homogeneous oxide mixture is obtained that can be used directly without compression or briquetting. This material is suitably reduced before use as a catalyst.

Heretofore, such catalysts containing black unglowed chromium oxide have displayed a disadvantageously large tendency to become coated during use with a carbonaceous deposit which apparently acts to prevent access of the reactant gaseous molecules to the active catalytic surface and thus to hinder or to stop further reaction. Attempts to reduce this carbonizing tendency by exhaustive purification of the materials used in the manufacture of the catalysts have been without much avail. In consequence of this undesirable carbonizing effect, the operating period during which a particular batch of catalyst could be used to produce efficient or profitable conversion has been relatively short, and frequent stoppage and interruptions of the conversion process for the purpose of reactivating the catalyst by burning off the carbonaceous deposit have been necessary, with attendant loss of time, energy, labor and economical use of equipment. For example, in the case of the dehydrogenation of isobutane at atmospheric pressure at 500° C., and at a flow rate of about 2 liters per hour per cubic centimeter of catalyst, the period during which conversion of isobutane into isobutylene amounted to 10 per cent or more has generally been less than two hours. This pronounced carbonizing tendency has constituted a major defect and disadvantage of the prior art and has largely hindered or prevented the industrial development of clean-cut catalytic dehydrogenation of paraffin hydrocarbons into the corresponding mono-olefins. It has been very troublesome and aggravating with respect to this specific catalytic reaction because it increases rapidly with increase in the operating temperature, especially above 400° C., whereas, as is well known from thermodynamical data, the dehydrogenation of normally gaseous paraffin hydrocarbons usually requires temperatures higher than 400° C. for obtaining more than minor yields. For example, even in the most favorable case of isobutane, thermodynamical data show that the maximum possible conversion at atmospheric pressure into isobutylene at 400° C. is less than 10 per cent. This means that the isobutane would have to be recycled or passed over the catalyst more than 10 times before it would be completely converted into isobutylene. Such multiple recycling or passing is prohibitively expensive because of the necessity of removing hydrogen and olefin product from the treated gas before recycling of the unconverted isobutane can be advantageously effected. On the other hand, a higher temperature permits complete conversion in a smaller number of passes, because of the higher dehydrogenation yield that is then thermodynamically possible. Thus, at 500° C. only about 3 passes of isobutane over a highly efficient catalyst should be sufficient to effect substantially complete conversion to isobutylene. It is clear, therefore, that the catalysts used heretofore have been, because of their pronounced carbonizing tendency, quite defective and inadequate for an industrially profitable process of catalytically dehydrogenating paraffin hydrocarbons into the corresponding mono-olefins. Similarly, in the hydrogenation of olefin hydrocarbons, in spite of the generally lower temperatures used, the length of the practically useful and profitable operating period of the catalysts of the prior art often has been considerably shortened because of their catalytic activity becoming inhibited by a deposit of carbonaceous matter.

Another defect and disadvantage of the catalysts used heretofore is that the total useful life of any particular catalytic preparation has been relatively short. This has been due in large part to the necessity of making frequent reactivations of the catalyst by burning off the carbonaceous deposit formed during each operating period such as a period of use for dehydrogenating paraffin hydrocarbons. It has generally been impossible to make more than about 10 or a dozen such reactivations before the catalyst deteriorated to the extent that it was no longer capable of causing sufficient conversion to make further use of catalyst profitable. This has been due to a combination of factors which have not been fully understood, among which is undoubtedly the thermal shock caused by the heat of combustion liberated during reactivation. Due to the heavy expense involved in the making of catalysts containing black, unglowed chromium oxide, whether through the wet precipitation or gel method or through the dry or non-spontaneous thermal decomposition method, the short total useful life of such catalysts has constituted a major defect and disadvantage of the prior art.

A further defect and disadvantage of the catalysts used heretofore is that relating to the magnitude of the thermal shock experienced by the catalyst during reactivations. Aside from more or less controllable factors such as the furnace temperature at which the catalyst is kept during reactivation and the rate of flow of the oxidizing gas used for effecting reactivation, the magnitude of the thermal shock is largely dependent upon the size and character of the carbonaceous deposit. The reason for this appears to be that the combustion of the carbonaceous deposit, whereby the catalyst is reactivated, generally does not take place uniformly and simultaneously throughout the catalyst bed but only within a narrow zone which consumes substantially all of the oxygen in the incoming reactivating gas. As the carbonaceous matter is oxidized or burnt off, the zone of combustion moves slowly in the direction of flow of the oxidizing gas. Because of this localized character of the reactivating reaction, a large amount of heat of combustion is evolved within each successive narrow zone of reactivation and each portion of the catalyst is subjected in its turn to a sudden and sometimes very large rise in temperature. With heavy carbonaceous deposits such as are accumulated during use by the catalysts of the prior art, especially catalysts whose carbonizing tendency has not been decreased by the incorporation of heavy metal oxides in accordance with the aforementioned application of Frey and Huppke, the amount of heat of combustion is so large and the resulting temperature within the zone of reactivation is so high that frequently the catalyst may undergo the well-known glow, or calorescence phenomenon, which further raises the temperature by its own evolution of heat, and the black form of chromium oxide is thereby changed to the ordinary or common green form of chromic oxide which is totally inadequate and inefficient for the catalytic conversion of hydrocarbons by changing their carbon-to-hydrogen ratio at elevated temperatures. Such sudden and sometimes total loss of catalytic activity for hydrocarbon conversion by a costly catalyst entails a prohibitive expense and it has constituted in the past a considerable barrier to the development of this catalytic process on an industrial scale.

A still further defect and disadvantage of the prior art has been the necessity of using a costly and expensive recovery process for recovering the material in the spent or deteriorated catalysts, or in catalysts that had undergone glowing, and then reworking them into new batches of active catalyst. By sufficiently extending or multiplying the total useful life of a catalyst and by decreasing the frequency of occurrence of the undesirable and destructive glow or calorescence phenomenon, the necessity of such a recovery system could be eliminated for it would then be justifiable, economically, to use fresh chemicals for a new batch of catalysts and to dispose of the spent or deteriorated or glowed catalyst in other ways without purchasing and maintaining an expensive system of recovery equipment.

It is among the objects of our invention to overcome the hereinbefore described defects and disadvantages of the prior art.

One of the objects is to produce catalysts containing black, unglowed chromium oxide with a decreased or minimized tendency to become coated with a carbonaceous deposit during use.

Another object of our invention is to treat such a catalyst so as to increase or multiply the duration of each operating period of active catalytic use beyond that possible heretofore.

A further object is to diminish the magnitude of the thermal shock experienced by such catalysts during reactivations.

Another object is to impart to catalysts containing black, unglowed chromium oxide a superior resistance to thermal shock.

A still further object is to decrease or minimize the frequency of occurrence of the destructive glow phenomenon in chromium-oxide-containing catalytic materials.

A still further object is to eliminate the necessity for a costly and expensive process of recovering spent or deteriorated or glowed chromium oxide-containing catalysts.

Other objects and advantages of our invention will be obvious to those skilled in the art from the following description and examples.

We have found that catalysts which contain or consist of black and unglowed or uncaloresced chromium oxide may be subjected to a carefully controlled thermal treatment at temperatures appreciably above the temperatures at which processes using these catalysts are generally operated without undergoing undesirable and harmful transformation accompanied by glowing or calorescence. We have found further that when these catalysts are subjected to the treatment of our invention they acquire unforseen and highly desirable characteristics. These characteristics include increased activity and prolonged life, decreased tendency to form harmful or masking carbonaceous deposits and increased resistance to disruption into dust or conversion into the green inactive form of chromium oxide.

One embodiment of our invention comprises preparing a material containing black, unglowed chromium oxide in which chromium with a valence greater than three, in the form of oxides higher in oxygen content than chromic oxide, is present to an extent equivalent to a hexavalent chromium content of from 1 to 40 per cent of the total chromium; slowly reducing the material, say, by hydrogen, under such controlled thermal conditions that spontaneous thermal decomposition of the higher oxides does not occur and that reduction proceeds progressively and by degrees without any sudden or large rise in temperature due to the exothermic reduction reaction, preferably with hydrogen and advantageously in the presence of an inert diluent gas such as substantially oxygen-free nitrogen, carbon dioxide, or the like, advantageously at a temperature below 300° C. and more advantageously in the temperature range from about 175° to 250° C.; heating the reduced material by degrees under progressively increasing temperature conditions to a temperature substantially higher than the operating temperature to be used. Such a temperature will be broadly in the range 550° to 800° C., advantageously in the range 600° to 650° C., and more advantageously in a current of an inert gas of high molar heat, such as carbon dioxide; maintaining the material in such temperature range for a period measurable in hours; cooling the material and at some time thereafter using it as a catalyst at an elevated temperature in the range 200° to 600° C.

We have found that prior to reduction, the material should have a content of chromium with a valence greater than three, determined as hexavalent chromium by its action in liberating iodine in an acidified solution of potassium iodide, of from about 1 to 40 per cent of the total chromium and preferably from 15 to 35 per cent. For the sake of convenience, we shall hereinafter speak of such chromium with a valence greater than three as being higher-valent chromium. We have found that materials containing substantially no higher-valent chromium, such as preparations obtained by drying the hydrous chromic oxide gel of the wet method of preparation in a vacuum or in a non-oxidizing atmosphere such as substantially oxygen-free hydrogen, nitrogen or carbon dioxide, or by leaching out with water any higher-valent chromium from materials prepared by controlled and non-spontaneous thermal decomposition of ammonium-containing salts of chromic acid or from gels dried in an oxidizing atmosphere, do not possess high potential catalytic activity for the conversion of hydrocarbons at elevated temperatures, in spite of the fact that such materials do not differ in apparent physical properties or appearance from those that do contain higher-valent chromium and that upon reduction yield highly efficient catalysts.

In the case of materials prepared by using the wet or gel method, the desired content of higher-valent chromium is obtainable by partial drying of the hydrous gel in an oxidizing atmosphere such as air. The drying in air is preferably carried out gradually, beginning at a temperature not greatly above room temperature, suitably 40° or 50° C., and ending at a temperature below about 200° C., suitably 150° C.; the aim should be to avoid disrupting the gel structure of the catalyst by too rapid drying.

The formation of higher oxides is usually extremely slow at ordinary temperatures but more rapid at 150° C. and above, and any particular schedule of times and temperatures for producing a gel, both dried and partially oxidized in accordance with our invention, is readily determined by trial. If desired, higher oxides may be incorporated in limited proportion without injuring the gel by digesting the precipitated jelly prior to drying with an aqueous solution of a limited amount of soluble chromate, dichromate or chromic acid to furnish chromate ion that is adsorbed by the jelly or undried gel and that later forms chromium oxide richer in oxygen than chromic oxide. During the drying and partial oxidation, temperatures above 200° C. should be avoided in order to avoid oxidizing the chromium in the material to an extent greater than about 40 per cent. A content of higher oxides equivalent to more than about 40 per cent of the chromium as hexavalent chromium is undesirable because we have found that there exists a marked tendency of such higher oxides to undergo a spontaneous thermal decomposition which causes the material more or less completely to disintegrate into dust and to lose its potential catalytic activity. Frequently, such thermal decomposition is accompanied by glowing or calorescence and the material is transformed into the undesired green form of chromium oxide. In any case, the temperature should not be allowed to exceed about 300° C., and preferably not above about 250° C., in order to avoid this spontaneous thermal decomposition of the higher oxides. When the higher oxides are permitted to decompose, the catalysts produced from the residue are of inferior mechanical strength and are inferior or worthless for catalytic conversion of hydrocarbons by changing their carbon-to-hydrogen ratio at elevated temperatures.

In the case of catalysts prepared through the dry or non-spontaneous thermal decomposition method, in accordance with the aforementioned application of Matuszak and Morey, the material generally possesses a suitable content of higher-valent chromium before reduction. It is, however, possible to oxidize the material more than is desirable by long-continued heating in an oxidizing atmosphere such as air. For example, if an ammonium salt of chromic acid is non-spontaneously thermally decomposed in air at 200° C., the content of higher-valent chromium will decrease from an initial value of 100 per cent to a minimum value between about 30 and 35 per cent and then it will increase again due to oxidation by air. Under these circumstances, it is desirable to terminate the thermal non-spontaneous decomposition approximately when the minimum value of higher-valent chromium is reached. Alternatively the non-spontaneous thermal decomposition may be carried out in a non-oxidizing atmosphere, whereby the further or excess oxidation does not occur. We have successfully carried out non-spontaneous thermal decomposition of ammonium dichromate and ammonium chromate in atmospheres of hydrogen, nitrogen, carbon dioxide and ammonia gas. It is preferred to carry out the non-spontaneous thermal decomposition at temperatures below 200° C., since such temperatures do not promote rapid excess oxidation and since the danger of spontaneous ignition or explosive decomposition is minimized. Nevertheless, it is not desirable to use temperatures much below 175° C., since such temperatures needlessly prolong the non-spontaneous thermal decomposition period. This is indicated by the experimental facts that in the thermal decomposition of a sample of ammonium dichromate in air in an electric oven kept at 200° C. a minimum content of 32 per cent higher-valent chromium was reached in a period of about 15 hours whereas when the oven was kept at 175° C., this period became about 11 days. For these reasons, it is preferable that the decomposition temperature be between 175° and 200° C. It is possible, however, to successfully decompose ammonium salts of chromic acid non-spontaneously at temperatures somewhat above this preferred range, up to about 225° or 230° C., if all conditions are favorable; but it is felt that the gain effected at these higher temperatures in shortening the period of decomposition does not compensate for the increased danger of spontaneous thermal decomposition and consequent more or less complete destruction of inherent or potential catalytic activity insofar as conversion of hydrocarbons is concerned.

After the homogeneous oxide mixture that comprises the material has been prepared with a suitable content of higher-valent chromium, it is reduced. This can be done with any reducing gas, such as hydrogen, carbon monoxide, butane, propane and the like, but it is advantageous to use hydrogen, as therewith the reduction can be carried out at the lowest possible temperature. The temperature should not in any case be allowed to rise above 300° C. before the reduction is complete, and preferably not above 250° C., since above this temperature thermal decomposition of higher chromium oxides is rapid and the particles may disintegrate into dust and simultaneously lose much or all of their catalytic activity. Reduction can be carried out at as low a temperature as 175° C. or less and preferably it is carried out with the temperature slowly and gradually increasing from about this value to one of about 250° C. It is further preferable to dilute the hydrogen with an inert diluent gas such as nitrogen or carbon dioxide, as the diluent gas tends to prevent or minimize any local rise in tempertaure caused by the reduction, which is highly exothermic in character. Due apparently to its higher molar heat and its greater tendency to be adsorbed on the material, carbon dioxide is somewhat superior to nitrogen as a diluent gas, as it appears to be capable of absorbing more energy arising from the reduction than is nitrogen, probably not only in the form of molecular and intra-molecular energy but also in the form of latent heat of desorption. However, the lack of such dilution is not to be considered as going outside of our invention.

It is believed that under the conditions described herein only the oxides of chromium having a valence greater than three undergo reduction. The reduction does not change the general appearance of the material, which may be described as a homogeneous oxide mixture, and for this reason we consider that it contains black, unglowed chromium oxide both before and after reduction.

After the reduction is complete, the temperature of the catalyst is gradually or stepwise raised to a temperature in the range of 550° to 800° C. This may be done in vacuo or in the presence of a gaseous atmosphere. It is essential, however, that any gaseous atmosphere used be non-oxidizing at temperatures up to about 400° C., for below this temperature the reduced chromium oxides can undergo re-oxidation and subsequent thermal decomposition. Above about 400° C., free oxygen may be present in the atmosphere insofar as this effect is concerned, since the higher oxides of chromium are so unstable above this temperature that they are not formed; therefore, at temperatures above 400° C., the heating may be carried out in the presence of air. We prefer, however, to use a non-oxidizing atmosphere and we have successfully used atmospheres of hydrogen, nitrogen, carbon monoxide and carbon dioxide, as well as a vacuum. The use of carbon dioxide in this way appears to be somewhat advantageous, due apparently to its higher molar heat and greater ease of being adsorbed, and through its use sudden or large local rises in temperature or thermal shocks are inhibited or minimized. For example, when we subjected two samples of a certain reduced chromium oxide gel catalyst to a simultaneous and, in all possible respects, identical heat treatment in the same furnace at temperatures up to about 725° C., except that in one case the sample was in a flowing atmosphere of hydrogen and in the other in one of carbon dioxide, we found at the end that the latter sample remained a jet black, whereas the hydrogen-treated sample had changed to a slight but distinct greenish tint and was definitely inferior in catalytic activity when tested for the conversion of iosbutane to isobutylene.

The catalyst is advantageously maintained at about 550° C. or higher for a number of hours. The duration of heating is not critical and need not be confined to narrow limits, for a suitably long period of heating can be readily found by trial. We have found a period of one day or twenty-four hours to be generally suitable at a temperature of 600° C. Shorter heating periods may also be used, especially if the temperature is above 600° C. In general, however, the period of time should exceed one hour. We have successfully used temperatures of 650° and 700° C. and in certain cases have also successfully used temperatures between 700° and 800° C. In all cases, however, it is advantageous to reach these high temperatures gradually or by graduations or stepwise. For instance the heating may be continued for a few hours at 400° C., then the temperature may be raised to 450° C. and the heating continued for a few hours before another 50° C. rise in temperature is made and so on, stepwise, until the maximum desired temperature is reached. The control of the temperature may be accomplished manually or by one of the several temperature-controllers available on the market. While the glow phenomenon is ordinarily encountered at 600° C., or below, as the prior art shows, the survival of the unglowed form of chromium oxide at 600° C. and above results when the procedure set forth is followed, even in the absence of stabilizing ingredients. In preparing catalysts which are to be used at low operating temperatures, the high-temperature treatment may take place somewhat below 600° C. such as between 550° and 600° C. In such a case, the time of treatment will be considerably longer than has been indicated for the higher temperatures.

As an example illustrating the use of our process, we cite the following details, which are given for the purpose of illustration only and not as limiting the scope of our invention in any way. A quantity of a sol previously concentrated by drying which, by analysis, contained 84 grams of chromic nitrate, $Cr(NO_3)_3$, 76 grams of chromic oxide, $Cr_2O_3$, and 75 grams of water was dissolved in 30 liters of hot rain water from a cistern and precipitated by the addition of aqueous ammonia in slight excess. The precipitate was washed with cistern water and then dried in air for 25 days at 50° C. and 24 hours at 175° C. The thus dried material still contained much water, and when heated to 450° C. it shrank about 20 per cent in volume. A weighed, approximately 1-gram, portion of the material dried at 175° C. was analyzed for total chromium by being gently heated in 5 cc. of a saturated solution of mercurous nitrate, whereby the higher-valent chromium was reduced to the trivalent condition. Then the mixture was evaporated and ignited to constant weight as chromic oxide. We analyzed another weighed portion, of approximately 0.2 gram, for higher-valent chromium by dissolving it in 500 cc. of hot 6–7 per cent sulfuric acid, cooling, adding an excess of potassium iodide, about 2 grams, and then titrating the liberated iodine with 0.1 normal sodium thiosulfate solution, with starch as indicator. In this way, on the assumption that the higher-valent chromium, or the chromium with a valence greater than three, was in the form of hexavalent chromium, it was found that the material dried at 175° C. contained 19.5 per cent by weight of the chromium as higher-valent chromium. The material was granulated to a size passing through a 20-mesh but retained on a 40-mesh seive and then it was reduced by being kept in a flowing atmosphere of hydrogen at a temperature of 175° C. for a number of hours.

A 5-cc. sample, A, of the granules of catalyst obtained by reduction of the material at 175° C. was placed in a vertical catalyst chamber made from a length of heat-resistannt glass tube of about 8 mm. in internal diameter and provided with a concentric internal thermocouple well. It was then slowly heated by an electric resistance furnace in the presence of a downwardly flowing atmosphere of hydrogen to a temperature of 450° C. After the catalyst had been maintained at 450° C. for about an hour, the hydrogen was replaced by a stream of isobutane at atmospheric pressure and flowing at the rate of about 10 liters per hour. Conversion of the isobutane to isobutylene began immediately at 16 per cent, increased to the equilibrium value of about 17 per cent within about half an hour, maintained this value for 4 hours, and then gradually decreased, apparently because of the accumulation of a carbonaceous deposit on the active surface of the catalyst, to 10 per cent in about 9 more hours. During this time the heating was so regulated that the temperature at the bottom of the catalyst bed, as measured by an iron-constantan thermocouple, was 450° C.; at higher points in the catalyst bed the temperature was somewhat lower than this value because of removal of heat by the endothermic dehydrogenation reaction. At the end of the run the volume of the catalyst was found to be 3.9 cc. After reactivation overnight in a current of air at temperatures gradually increasing from room temperature to about 285° C., whereby the carbonaceous deposit was burned off from the catalyst, it was again reduced by being heated in a stream of hydrogen from room temperature to 450° C., and it gave in a second run with isobutane at 450° C. identically the same performance as in its first run.

A second 5-cc. sample, B, of catalyst obtained by reduction of the material at 175° C. was gradually heated in a vacuum to 600° C. and maintained under these conditions for 16 hours. It was then reduced in temperature and tested for catalytic activity with isobutane at 450° C. under the same conditions that had been used for the two runs already described for sample A. The immediate initial conversion of isobutane to isobutylene amounted to 8 per cent and this increased to the equilibrium value of 17 per cent in a period of about 3 hours. Thereafter equilibrium conversion was maintained for 14 hours, after which the conversion gradually dropped to 10 per cent in about 25 hours. Comparison of these data with those obtained with sample A establishes the facts that the portion of catalyst given the preliminary heating at 600° C. caused equilibrium conversion of isobutane to isobutylene for more than three times as long a period as did the portion not so treated and that its rate of deactivation or the rate of formation of a carbonaceous deposit was only about a third as great as that of the untreated portion. When reactivated in a current of air and given a further high temperature treatment in vacuo at 650° C. for 18 hours, sample B in a second run at 450° C. gave the same performance as in its first run except that the induction period, during which conversion increased from an initial value of about 3 per cent to the equilibrium value, was increased to 6 hours. Equilibrium conversion, about 17 per cent of isobutane into isobutylene, was maintained for 14 hours and then the conversion gradually decreased to 10 per cent in 25 hours.

A third 5-cc. sample, C, of catalyst obtained by reduction of the material at 175° C. was tested with isobutane at 450° C. in the manner already described for sample A. The conversion reached the equilibrium value in about an hour, remained constant at the equilibrium value of about 17 per cent for 4 hours, and then decreased to 10 per cent in a period of 8.5 hours. As was to be expected, the performance was practically identical with that given by sample A. After this initial run, sample C was reactivated and then heated in vacuo at 600° C. for 24 hours. After this high temperature treatment at 600° C., the catalyst was used in a second run with isobutane at 450° C. The conversion increased from an immediate initial value of 5 per cent to the equilibrium value of 17 per cent in a period of 5 hours, maintained the equilibrium value for 18 hours, and then decreased to 10 per cent in 22 hours. It is apparent that the heat treatment at 600° C. resulted in a very large improvement in the performance of this catalyst, for the overall operating or dehydrogenating period was multiplied three-fold. The same excellent and enhanced performance was repeatedly obtained in subsequent runs made with the same portion of catalyst.

A fourth 5-cc. sample, D, of catalyst obtained by reduction of the material at 175° C. was gradually heated to about 600° C. in a current of hydrogen and then it was kept at this temperature for about 24 hours. When afterwards, tested with isobutane at 450° C., it caused equilibrium conversion to isobutylene for 18 hours; then its activity gradually declined with the accumulation of a carbonaceous deposit until the conversion decreased to 10 per cent in 22 more hours. The performance of this sample, which was heat-treated in hydrogen, was thus practically identical with that of sample C, which had been heat-treated in a vacuum.

From the data we have given in the foregoing illustration, we believe that the catalyst was catalytically active in two ways, namely, in promoting a desirable dehydrogenation reaction and in promoting an undesirable carbonizing reaction which resulted in a cumulative or progressive deactivation of the catalyst. All catalysts containing the black, unglowed form of chromium oxide, whether prepared from a gel or by other means, appear to behave catalytically in these two ways simultaneously when used for the conversion of hydrocarbons by changing their carbon-to-hydrogen ratio at elevated temperatures. We wish to point out specifically that the high temperature treatment of our process resulted in a decrease in the catalyst's power to promote the undesirable carbonizing reaction and that this manifested itself as a relative increase—an increase of three fold in the present instance—in its effect in altering the carbon-hydrogen ratio of a hydrocarbon for an extended period. This is clearly indicated by the experimental facts which show that the rate of deactivation or the rate of carbonizing was reduced by the high temperature treatment to a mere fraction of its value prior to the heat treatment and that the sustained power to dehydrogenate isobutane was increased by a factor of three. This is an important, novel and highly useful advantage brought about by the process of our invention.

The data given in the foregoing illustration of the improvement of a catalyst containing the black, unglowed chromium oxide produced by the practice of our invention were obtained when the catalyst was tested at a constant temperature of 450° C. We have found that the improved catalyst gives similarly enhanced performance when it is tested under constant-conversion conditions. For example, a fifth 5-cc. sample, E, of the catalyst hereinbefore described as being prepared by reduction at 175° C., was heated in hydrogen to a temperature of 450° C. and was then tested with isobutane under such automatically and mechanically controlled temperature conditions that the conversion remained at a somewhat fluctuating but substantially constant value of about 17 per cent. When the temperature reached approximately 510° C., the run was stopped. Under these conditions a conversion of about 17 per cent was maintained for 10 hours. But when sample B, which was a portion of the same material but which, as has been described hereinbefore, had been heated in vacuo at 600° C. for 24 hours, was tested under the same constant-conversion conditions, it gave a conversion of 17 per cent of isobutane to isobutylene, at temperatures up to 510° C., for 31 hours. In other words, the high temperature treatment of our invention so improved the catalyst by decreasing its carbonizing power that the period during which conversion could be maintained at 17 per cent, at a temperature gradually increasing from 450° C. to 510° C., was tripled.

In another set of comparative runs, there was used a chromium oxide gel catalyst prepared from sodium dichromate in accordance with the directions given in Morey's aforementioned co-pending application. Before reduction, this material contained 16.3 per cent by weight of its total chromium in the form of higher-valent chromium determined as hexavalent chromium. The material was carefully reduced in a stream of a mixture of about 10 per cent hydrogen and 90 per cent nitrogen by volume. A 5-cc. portion of the reduced material, when used as a catalyst with isobutane at atmospheric pressure under constant-conversion conditions at a temperature which was gradually increased from 450° to 510° C., caused a conversion of about 17 per cent for a period of 20 hours. A second 5-cc. sample of the reduced material was heated in vacuo for 3 hours at 400° C., then for 2 hours at 450° C., and then for 1 hour at 640° C. This second sample, when tested for catalytic activity under the same conditions as the first sample, caused a constant conversion of about 17 per cent of isobutane to isobutylene for 32 hours. A third 5-cc. sample of the reduced material was heated under the same conditions, at the same time and in the same electrically heated furnace, as the second sample except that it was kept in a flowing atmosphere of hydrogen instead of in a vacuum. This third sample of catalyst, when used under the same conditions as those for the first two samples, maintained a constant conversion of about 17 per cent of isobutane to isobutylene for 39 hours. These data, like those already cited, show that the high temperature treatment of our process caused a definite improvement in the ability of the catalyst to maintain sustained dehydrogenation with decreased formation of a carbonaceous deposit, for in the case of the third sample the period of constant conversion was practically double that obtained with the first sample. Such improvement of the catalytic properties of catalysts containing black, unglowed chromium oxide is permanent and not transitory and it does not vanish or decrease if a more or less extended period of time elapses before the catalyst is used.

It is believed that greater improvement would have been obtained in the case of the last two mentioned catalyst samples if their high temperature treatment had been carried out more carefully, for it will be noted that in their treatment there was a large jump of 190° C. in the temperature when the temperature was raised from 450° to 640° C. Because of this large jump in temperature, which constituted somewhat of a thermal shock to the catalyst, it is believed that the catalyst underwent a partial or incipient glowing or calorescence which offset or destroyed a part of the potential improvement that could otherwise have been effected. In this connection, there is also demonstrated the advantage of using a flowing gaseous atmosphere instead of a vacuum during the high temperature treatment, for in the case of the second sample, which was heated in a vacuum, the partial glowing evidently proceeded to a greater extent than in the case of the third sample, which was in a flowing atmosphere of hydrogen. It is believed that the hydrogen facilitated the removal of the heat liberated during the partial or incipient glowing or calorescence and thereby prevented its spread in the third sample from becoming as great as in the second sample.

As has been already noted, we have observed in other experiments that gases possessing higher values for molar heat than hydrogen, or which appear to be adsorbed more readily by catalysts containing the black, unglowed form of chromium oxide than is hydrogen, such as carbon dioxide, are thereby better absorbers of the heat liberated by incipient glowing or of heat attendant upon thermal shocks and hence in this respect are somewhat more advantageous for use in our process than is hydrogen, after the material has been subjected to controlled reduction. In a specific example which illustrates this point, two samples of a certain chromium oxide gel catalyst, which had been previously carefully reduced with 10 per cent hydrogen and 90 per cent nitrogen at a temperature gradually increasing to a maximum of about 250° C., were heated in hydrogen to 400° C. in separate catalyst tubes disposed in one and the same furnace, which insured the same temperature conditions for both samples. The rate of increasing the temperature was about 150° C. per hour. When the temperature became 400° C., the stream of hydrogen for one sample was replaced by a stream of carbon dioxide. Then the heating was continued until the temperature reached 600° C. The two samples were kept at this temperature for 11 hours. Then they were cooled and tested for catalytic activity with isobutane at atmospheric pressure under constant-conversion conditions. The hydrogen-treated sample caused 17 per cent conversion, at temperatures increasing from 450° to 545° C., for only 3 hours; but the carbon dioxide-treated sample caused 17 per cent conversion, at temperatures increasing from 450° to 502° C., for 18 hours. Thus, in spite of the smaller temperature range used for the test with the carbon dioxide-treated sample of catalyst, it gave much the better performance of the two.

We do not wish to limit our invention to the specific conditions of materials, temperatures, times, pressures and the like which are described in the foregoing illustrations. For instance, for the sake of being able to make direct comparisons, we have limited our specific illustrative examples to the dehydrogenation of isobutane. However, the treated catalysts of our invention may be used for the dehydrogenation of other paraffin hydrocarbons, such as normal butane, propane, ethane and heavier paraffin hydrocarbons through heavy oils and waxes, and for the hydrogenation of unsaturated organic compounds such as olefin hydrocarbons and the like, and we have found the treated catalysts to be, within the limits imposed by thermodynamics, equally efficient for use with these materials. Similarly, although in our specific examples we have used a pressure of one atmosphere, it is well known on thermodynamic grounds that decreased pressure favors dehydrogenation and that increased pressure favors hydrogenation and we have established in other runs the suitability of our catalysts for use at pressures below and above atmospheric. Furthermore, we have found that our treated catalysts containing black, unglowed chromium oxide possess a high resistance to poisoning by the usual catalytic poisons and that in the case of the most common poison, sulfur, our catalysts may be used for desulfurizing organic materials by converting the organic sulfur contained therein substantially completely into hydrogen sulfide, which may be then removed by well-known means, as by an alkali wash. In fact, they may be used to advantage in all reactions in which untreated catalysts of the prior art could be used.

Our invention, whereby we produce chromium oxide of improved catalytic properties, is likewise applicable to chromium oxide when associated and blended with other metallic oxides as set forth in the co-pending application, previously referred to, of Frey and Huppke, Serial No. 723,608, filed May 2, 1934, now U. S. Patent 2,098,959, issued November 16, 1937.

By the practice of our invention we have overcome the hereinbefore described defects and disadvantages of the prior art and have obtained the following important and useful objects or advantages which are novel as far as the prior art respecting catalysts containing black, unglowed chromium oxide is concerned. We have improved such catalysts by decreasing their carbonizing tendency to the extent that their useful life per operating period is multiplied several fold. The catalysts treated in accordance with our invention, due to the smaller deposit of carbonaceous matter formed during use, are subject to materially smaller thermal shock during reactivations and hence do not undergo the destructive glow or calorescence phenomenon as readily as the untreated catalysts of the prior art. Furthermore, our treated catalysts have a superior resistance to thermal shock. In consequence of these improvements, our treated catalysts can be reactivated many more times than the untreated catalysts of the prior art and their total aggregate useful opertaing life can now be measured in thousands of hours in comparison with tens of hours for many untreated but otherwise properly prepared catalysts; in other words, the total useful operating or catalytic life of the catalysts has been multiplied by the practice of our invention by a factor of as much as 100. We have also thereby eliminated the necessity of using an expensive recovery process for recovering spent or deteriorated of glowed catalysts, for our invention has generally made it more economical to discard such spent catalysts and to use fresh chemicals for a new batch of catalyst than to purchase and maintain the costly equipment required for such a recovery process.

Mention has been made herein, that the chromium oxide or oxides which are present before controlled reduction, whether in oxide gels or in residues from controlled and non-spontaneous thermal decomposition of ammonium-containing salts of chromic acid, have a varying content of chromium oxide wherein the chromium has a valence greater than three and this has been termed higher-valent chromium. It has been shown that this chromium may be considered to be in a hexavalent state, since it causes the liberation of iodine from an acid sclution of potassium iodide. A method for determining the content of this higher-valent chromium based upon this reaction is obvious and suitable conditions for the use of such a method have been indicated by an example. The exact nature of this higher-valent chromium, i. e., whether or not it be truly hexavalent, has not been conclusively proven, but so far as the present invention is concerned this does not affect the results produced other than as discussed and disclosed hereinbefore. Therefore, any mention made herein, or in the claims which follow, of hexavalent chromium in chromium oxide or of chromium oxide of any particular content of hexavalent chromium or of chromium higher-valent than chromium with a valence of three, is to be considered in the light of the discussion and disclosure contained herein.

We do not wish to exclude from our invention certain modifications or alternatives which will be obvious to those skilled in the art. For example, it is an obvious modification of our invention to use a relatively heavy or strongly adsorbed gas such as carbon dioxide, either alone or as a mixture of two or more such gases, or in admixture with a light gas such as hydrogen during the stage or stages of heating a chromium oxide-containing catalyst to a high temperature in the range of 550° to 800° C. and during a part of the high temperature treatment, and thereafter up to the beginning of use of the catalyst in a catalytic process to use a light and relatively less easily adsorbed gas such as hydrogen either alone or in admixture with other relatively poorly adsorbed gases such as nitrogen, whereby the advantages attendant upon comparatively high values of molar heat and high tendency to be adsorbed by the catalyst are obtained during the period when such properties tend to minimize or to inhibit any tendency to incipient glowing or to deterioration by thermal shock on the part of the catalyst and thereafter there is obtained the advantage that the strongly adsorbed molecules of gas or gases, which appear to act somewhat in the nature of a temporary catalytic poison, are removed or displaced by the less strongly adsorbed molecules of the light gas.

Furthermore, we do not wish to limit our invention to the details of materials, temperatures, times, and the like which we have cited in our illustrative examples. Nor is it to be limited by any discussion of a theoretical nature contained herein. Hence, we desire to have it understood that, within the scope of the appended claims, our invention is as extensive in scope and equivalents as the prior art allows.

We claim:

1. A process for treating catalysts containing black, unglowed chromium oxide reduced substantially to the extent possible with hydrogen at a temperature of from 175° to 250° C. to improve their characteristics, which comprises gradually heating said catalyst under non-oxidizing conditions to a temperature within the range 550° to 800° C., sufficiently slowly that the unglowed condition of said chromium oxide is substantially conserved, and maintaining the catalyst within said temperature range for a period of from 1 to 24 hours.

2. A process for treating catalysts containing black, unglowed chromium oxide reduced substantially to the extent possible with hydrogen at a temperature of from 175° to 250° C. which comprises heating said catalyst gradually under progressively increasing temperature conditions to a temperature within the range 550° to 800° C., sufficiently slowly that unglowed condition of said chromium oxide is substantially conserved, in a flowing atmosphere of an inert gas and maintaining said catalyst within said temperature range for a period of from 1 to 24 hours.

3. A process for treating catalysts containing black, unglowed chromium oxide reduced substantially to the extent possible with hydrogen at a temperature of from 175° to 250° C. which comprises heating said catalyst gradually under progressively increasing temperature conditions to a temperature within the range 550° to 800° C. in a vacuum sufficiently slowly that the unglowed condition of said chromium oxide is substantially conserved, and maintaining said catalyst within said temperature range for a period of from 1 to 24 hours.

4. A process for treating catalysts in the gel form containing black, unglowed chromium oxide reduced substantially to the extent possible with hydrogen at a temperature of from 175° to 250° C. which comprises heating said catalyst gradually under progressively increasing temperature conditions to a temperature within the range 600° to 800° C., sufficiently slowly that the unglowed condition of said chromium oxide is substantially conserved, and maintaining said catalyst within said temperature range for a period of from 1 to 24 hours.

5. A process for treating catalysts containing black, unglowed chromium oxide reduced substantially to the extent possible with hydrogen at a temperature of from 175° to 250° C. formed by the non-spontaneous thermal decomposition of an ammonium-containing salt of chromic acid to improve their characteristics which comprises heating said catalyst gradually under non-oxidizing and progressively increasing temperature conditions to a temperature within the range 600° to 800° C., sufficiently slowly that the unglowed condition of said chromium oxides is substantially conserved and maintaining said catalyst within said range for a period of from 1 to 24 hours.

6. In a process of preparing catalysts, the step which comprises heating a homogeneous oxide mixture in the form of a gel which contains black, unglowed chromium oxide, to a temperature within the range 50° to 200° C. in an oxidizing atmosphere for a period of time sufficient to establish a content of chromium with a valence greater than three that is equivalent in oxidizing capacity to a hexavalent chromium content within the range of 15 to 35 per cent of the total chromium in said mixture.

7. In a process of preparing catalysts containing black, unglowed chromium oxide the steps which comprise treating a homogeneous oxide mixture containing black, unglowed chromium oxide having a content of chromium with a valence greater than three that is equivalent in oxidizing capacity to a hexavalent chromium content of between 1 and 40 per cent of the total chromium with a suitable reducing gas at a temperature between 150° and 300° C. until reduction is substantially complete, and subsequently heating the material so treated gradually to a temperature within the range 550° to 800° C. under non-oxidizing conditions sufficiently slowly that the unglowed condition of said chromium oxide is substantially conserved, and maintaining the material within said temperature range for a period of from 1 to 24 hours.

8. A process of preparing catalysts which comprises heating a homogeneous oxide mixture in the form of a gel which contains black, unglowed chromium oxide, to a temperature within the range 50° to 200° C. in an oxidizing atmosphere for a period of time sufficient to establish a content of chromium with a valence greater than three that is equivalent in oxidizing capacity to a hexavalent chromium content within the range of 1 to 40 per cent of the total chromium in said mixture, treating the resultant material with a suitable reducing gas at a temperature between 150° and 300° C. until reduction is substantially complete, and subsequently heating the material so treated gradually to a temperature within the range 550° to 800° C. in a non-oxidizing atmosphere, sufficiently slowly that the unglowed condition of said chromium oxide is substantially conserved, and maintaining the reduced material within said temperature range for a period of from 1 to 24 hours.

9. A process for treating catalysts in the form of a dried gel comprising black, unglowed chromium oxide reduced substantially to the extent possible with hydrogen at a temperature of from 175° to 250° C., which comprises heating said catalyst gradually under non-oxidizing and progressively increasing temperature conditions to a temperature within the range of 600° to 700° C., sufficiently slowly that the unglowed condition of said chromium oxide is substantially conserved, and maintaining said catalyst in said temperature range for a period of at least one hour.

10. A process for treating catalysts in the form of a dried gel comprising black, unglowed chromium oxide reduced substantially to the extent possible with hydrogen at a temperature of from 175° to 250° C., which comprises gradually and progressively increasing the temperature of said catalyst under non-oxidizing conditions until it is within the range of 550° to 800° C., sufficiently slowly that the unglowed condition of said chromium oxide is substantially conserved, and maintaining the temperature of said catalyst within said range for at least one hour.

11. In the treatment of a material containing black unglowed chromium oxide in the form of a dried gel and with a content of chromium with a valence greater than three that is equivalent in oxidizing capacity to a hexavalent chromium content of between 1 and 40 per cent of the total chromium, the steps which comprise treating said material with a suitable reducing gas at a temperature between 150° and 300° C. until reduction is substantially complete, subsequently heating said reduced material in an inert gas gradually to a temperature within the range 550° to 800° C., sufficiently slowly that the unglowed condition of said chromium oxide is substantially conserved, and maintaining said material within said temperature range for a period of at least one hour.

12. A process for treating catalysts in the form of a dried gel comprising black, unglowed chromium oxide reduced substantially to the extent possible with hydrogen at a temperature of from 175° to 250° C., which comprises gradually and progressively increasing the temperature of said catalyst until it is within the range of 550° to 800° C., sufficiently slowly that the unglowed condition of said chromium oxide is substantially conserved, maintaining said catalyst in a non-oxidizing atmosphere at least while said catalyst has a temperature below 400° C. and maintaining said catalyst at a temperature between 550° and 800° C. for a period of from 1 to 24 hours.

13. A process for treating a catalytic material comprising black, unglowed chromium oxide reduced substantially to the extent possible with hydrogen at a temperature of from 175° to 250° C., which comprises increasing the temperature of said catalytic material to a temperature between 550 and 800° C. at a rate sufficiently slow to obviate glowing of said unglowed chromium oxide, and maintaining said catalytic material in said temperature range for at least about an hour.

14. A process for treating a catalytic material comprising black, unglowed chromium oxide reduced substantially to the extent possible with hydrogen at a temperature of from 175° to 250° C., which comprises increasing the temperature of said catalytic material to a temperature between 550 and 800° C. at a rate sufficiently slow to obviate glowing of said chromium oxide and in an inert atmosphere, and maintaining said catalytic material in said temperature range for at least about an hour.

15. A process for treating catalysts containing reduced, black, unglowed chromium oxide and adapted to be employed at a reaction temperature within the range 200°–600° C. for facilitating a chemical reaction, which comprises gradually heating said catalyst to a temperature above about 550° C. and above said reaction temperature but below that at which glowing of said chromium oxide occurs, for a period of time sufficient to increase its active life.

16. In a process for preparing gel catalysts containing black, unglowed chromium oxide, the improvement which comprises heating a homogeneous oxide mixture in the form of a gel which contains black unglowed chromium oxide to a temperature within the range 50° to 200° in an oxidizing atmosphere for a period of time sufficient to establish a content of chromium with a valence greater than three that is equivalent in oxidizing capacity to a hexavalent chromium content within the range of 15 to 35 per cent of the total chromium in said mixture, and then treating said mixture with a reducing gas at a temperature within the range 175° to 250° C. until reduction is substantially complete.

17. A process of treating catalysts capable of effecting dehydrogenation of hydrocarbons under dehydrogenation conditions, which comprises heating a catalyst containing black unglowed chromium oxide, formed by the non-spontaneous thermal decomposition of an ammonium-containing salt of chromic acid and reduced substantially completely to the extent possible with hydrogen at a temperature of about 250° C., to a temperature within the range of 550 to 800° C. under non-oxidizing conditions, sufficiently slowly that the unglowed condition of said chromium oxide is substantially conserved, and maintaining the catalyst within said temperature range for at least about an hour.

18. A process of treating catalysts, which comprises heating a catalyst comprising black unglowed chromium oxide, reduced substantially completely to the extent possible with hydrogen at a temperature of about 250° C., to a temperature within the range of 550 to 800° C. in an atmosphere comprising carbon dioxide, sufficiently slowly that the unglowed condition of said chromium oxide is substantially conserved, and maintaining the catalyst within said temperature range while in said atmosphere for at least about an hour.

19. A process of treating catalysts capable of promoting a catalytic reaction under suitable conditions of use, which comprises heating a catalyst comprising black unglowed chromium oxide, reduced substantially completely to the extent possible with hydrogen at a temperature of about 250° C., to a temperature within the range of 550 to 800° C. in a first atmosphere comprising carbon dioxide, sufficiently slowly that the unglowed condition of said chromium oxide is substantially conserved, maintaining the catalyst within said temperature range for at least an hour, and replacing the first atmosphere by a second atmosphere comprising hydrogen and substantially free from carbon dioxide while the catalyst is within said temperature range.

20. In a process of preparing catalysts, the step which comprises heating a homogeneous oxide mixture in the form of a gel which contains black, unglowed chromium oxide in an oxidizing atmosphere so gradually from an initial temperature of about 50° C. to a higher temperature not greater than about 200° C. that disruption of the gel structure of said mixture is avoided, said heating being terminated when the resulting content of chromium with a valence greater than three becomes equivalent in oxidizing capacity to a hexavalent chromium content within the range of 15 to 35 per cent of the total chromium in said mixture.

21. In a process for preparing gel catalysts containing black, unglowed chromium oxide, the improvement which comprises heating a homogeneous oxide mixture in the form of a gel which contains black, unglowed chromium oxide to a temperature within the range 50° to 200° C. in an oxidizing atmosphere for a period of time sufficient to establish a content of chromium with a valence greater than three that is equivalent in oxidizing capacity to a hexavalent chromium content within the range of 1 to 40 per cent of the total chromium in said mixture, and then treating said mixture with a reducing gas at a reduction temperature within the range 150 to 300° C. until reduction is substantially complete.

22. In a process for preparing gel catalysts containing black, unglowed chromium oxide, the improvement which comprises heating a homogeneous oxide mixture in the form of a gel which contains black, unglowed chromium oxide to a temperature within the range 50° to 200° C. in an oxidizing atmosphere for a period of time sufficient to establish a content of chromium with a valence greater than three that is equivalent in oxidizing capacity to a hexavalent chromium content within the range of 15 to 35 per cent of the total chromium in said mixture, and then treating said mixture with a reducing gas at a reduction temperature not greater than 300° C., until reduction is substantially complete.

23. In a process of making a catalyst, precipitating a chromium gel type oxide catalyst, washing the precipitate, and drying the precipitate at a temperature higher than room temperature but below the boiling point of water for at least 60 hours.

24. In a process of preparing a catalyst, precipitating a gel-type chromium oxide catalyst, washing the precipitate, and drying the precipitate in an oxidizing atmosphere at a temperature higher than room temperature and below about 200° C. for a period of time sufficient to establish a content of chromium with a valence greater than three that is equivalent in oxidizing capacity to a hexavalent chromium content within the range of 1 to 40 per cent of the total chromium in the mixture while avoiding disruption of the gel structure of the catalyst.

25. In a process of preparing a gel-type catalyst, the steps which comprise drying a homogeneous oxide mixture comprising chromium oxide gel in an oxidizing atmosphere at a temperature higher than room temperature and below about 200° C. for a period of time sufficient to establish a content of chromium with a valence greater than three that is equivalent in oxidizing capacity to a hexavalent chromium content within the range of 1 to 40 per cent of the total chromium in the mixture while avoiding disruption of the gel structure of the catalyst.

26. A process according to claim 25 in which the oxide mixture comprises chromium oxide gel and aluminum oxide.

GLEN H. MOREY.
FREDERICK E. FREY.

CERTIFICATE OF CORRECTION.

Patent No. 2,312,572. March 2, 1943.

GLEN H. MOREY, ET AL.

It is hereby certified that error appears in the printed specification of the above numbered patent requiring correction as follows: Page 5, first column, line 64, for "resistannt" read --resistant--; page 7, second column, line 46, for "opertaing" read --operating--; page 8, second column, line 10, claim 3, after "vacuum" insert a comma; line 30, claim 5, before "formed" insert --and--; and that the said Letters Patent should be read with this correction therein that the same may conform to the record of the case in the Patent Office.

Signed and sealed this 11th day of May, A. D. 1943.

(Seal)

Henry Van Arsdale,
Acting Commissioner of Patents.